United States Patent [19]

Bertrand et al.

[11] Patent Number: 5,274,028
[45] Date of Patent: Dec. 28, 1993

[54] POLYVINYL PYRROLIDONE-GRAFTED COATINGS ON PREFORMED POLYMERS

[75] Inventors: William J. Bertrand, Mission Viejo; Stephen L. Coulter, Irvine; Cary Reich, Laguna Hills; Paul DeAntonio, Westminister, all of Calif.

[73] Assignee: Baxter International Inc., Deerfield, Ill.

[21] Appl. No.: 622,917

[22] Filed: Dec. 6, 1990

[51] Int. Cl.$^5$ .................... C08F 283/00; C08F 283/12
[52] U.S. Cl. ........................ 525/17; 525/246; 525/426; 525/445; 525/454; 525/455; 525/468; 525/479; 525/529; 525/530; 525/531; 527/312; 527/314; 527/315
[58] Field of Search ............... 525/479, 17, 246, 426, 525/445, 455, 468, 529, 530, 531, 454; 527/315, 314, 312

[56] References Cited

U.S. PATENT DOCUMENTS

| | | |
|---|---|---|
| 3,627,836 | 12/1971 | Getson . |
| 3,631,087 | 12/1971 | Lewis et al. . |
| 3,700,573 | 10/1972 | Laizier et al. ............... 204/159.1 |
| 3,916,033 | 10/1975 | Merrill . |
| 3,939,049 | 2/1976 | Ratner et al. . |
| 4,146,489 | 3/1979 | Stambaugh et al. . |
| 4,228,256 | 10/1980 | Schmitt . |
| 4,229,273 | 10/1980 | Wajs . |
| 4,311,573 | 1/1982 | Mayhan et al. . |
| 4,589,964 | 5/1986 | Mayhan et al. . |
| 4,618,644 | 10/1986 | Liu . |
| 4,729,914 | 3/1988 | Kliment et al. . |

FOREIGN PATENT DOCUMENTS 0378511 7/1990 European Pat. Off. .
0378512 7/1990 European Pat. Off. .

Primary Examiner—Patricia A. Short
Attorney, Agent, or Firm—June M. Bostich; Janis Henry; Michael Kondzella

[57] ABSTRACT

In an improved method for producing a surface graft of a hydrophilic polymer upon a preformed solid or semi-solid polymer substrate having hydroperoxide groups along its surface, n-vinyl pyrrolidone is utilized as the surface-grafting monomer, the substrate is selected to be insoluble in n-vinyl pyrrolidone, and the polymerization is carried out in aqueous alkaline conditions utilizing a combination of metal salts to provide a variable valence metal ion in a reduced state capable of oxidizing to suppress homopolymerization of the monomer in the solution.

When the substrate is at least partially soluble in the n-vinyl pyrrolidone, an ethylenically unsaturated monomer having a higher reactivity with the substrate than n-vinyl pyrrolidone is added to the alkaline polymerization solution as a "seeding" monomer. Addition of the "seeding" monomer results in a surface-grafted copolymer effectively externalized from the substrate.

27 Claims, No Drawings

POLYVINYL PYRROLIDONE-GRAFTED COATINGS ON PREFORMED POLYMERS

BACKGROUND OF THE INVENTION

1. Field of the Art

This invention relates to highly hydrated polymers and more specifically to highly hydrated polymer surfaces grafted onto polymer substrates for use in medical devices.

2. Discussion of the Prior Art

There is evidence that highly hydrated polymers may be biocompatible and resistant to formation of blood clots and thromboemboli. However, hydrophilic polymers generally have low physical strength in aqueous environments so that useful, long-lived prosthetic devices and medical instruments cannot be produced from them. To overcome this drawback, techniques have been developed for grafting monomers such as n-vinyl-2-pyrrolidone, 2-hydroxyethyl methacrylate, and others, onto polymer substrates (e.g. silicone rubber, polyurethane, polyesters, polyolefins, polyvinylchloride, copolymers, etc.) These techniques produce a composite material having a hydrophilic surface on a strong, stable backing useful for prosthetic devices such as heart valves, poppets, implantable catheters, intrauterine devices, mammary prostheses, neuroshunts, medical tubings used in heart bypass operations and kidney dialysis procedures for the extracorporeal circulation of blood and power pack coverings for heart assist devices.

One such grafting procedure as taught in U.S. Pat. No. 3,939,049 to Ratner, et al. utilizes a mutual irradiation technique. A polymer substrate is fully immersed in a mixture of monomer and solvent and placed adjacent to a source of gamma radiation. After irradiation, the grafted polymer specimen is removed from the surrounding medium and cleaned. The surrounding medium, at this point, generally consists of polymer, unreacted monomer, and solvent and can be fully liquid, a tough crosslinked gel, or a combination of the two, depending upon reaction conditions. When the surrounding medium, the polymerization "solution," forms a crosslinked gel, homopolymerization of the monomer is occurring.

To obtain an evenly grafted surface film, it is usually desired that the surrounding medium be fully liquid, that is, that homopolymerization be inhibited. According to Ratner, et al., in the case of silicone rubber and a polyurethane-polyether copolymer, gelation of the homopolymer surrounding the grafted film can be inhibited by the presence of cupric salts. For polyethylene, however, the degree of graft is highest in the absence of the cupric salt. In the case of n-vinyl-2-pyrrolidone grafted onto silicone rubber, presence of the salt increases the amount of material grafted; however, increased penetration of the graft into the silicone rubber is associated with increased concentration of cupric ion. Thus, the salt needed to accomplish surface-grafting differs with the chemical properties of the polymeric substrate and the surface monomer.

There are two drawbacks in the Ratner process for application to the manufacture of medical devices. First, with a silicone matrix, the graft tends to become incorporated within the silicone matrix rather than remaining on the surface, thus defeating the purpose of the grafting procedure. Second, the mutual irradiation technique is expensive and requires specialized equipment to administer.

U.S. Pat. Nos. 4,311,573 and 4,589,964 to Mayhan et al. describe procedures for producing a graft copolymer utilizing many substrates, including silicone, and ethylenically unsaturated compounds such as methacrylamide, sodium methacrylate, or others, as the monomer wherein the substrate is peroxidized to produce a radical for bonding the graft. Polymerization takes place in the presence of iron salts, specifically ferrous ammonium sulfate, as a graft polymerization initiator and homopolymerization inhibitor. Polymerization can be initiated in the presence of squaric acid, which reduces the metal ions from their oxidized state after they have initiated a grafting reaction under acidic conditions. However, n-vinyl pyrrolidone is hydrolyzed in an acidic aqueous environment.

U.S. Pat. No. 3,627,836 to Getson discloses a method of grafting monofunctional and polyfunctional olefinic monomers to organopolysiloxanes. The monofunctional monomers include n-vinyl pyrrolidone and the polyfunctional monomers include esters of acrylic and methacrylic acid. However, in this process homopolymerization occurs to some extent. Due to homopolymerization the amount of the surface graft is not sufficient to form the lubricious, hydrophilic surfaces.

U.S. Pat. No. 3,631,087 to Lewis, et al. describes another conventional process for grafting organopolysiloxanes by the gradual addition of unsaturated monomers in the presence of free-radical initiators, i.e., peroxides. Generally, the preferred range of monomer addition is from about 0.5 to about 200 parts per 100 parts of polysiloxane. Although acrylic acid esters and n-vinyl pyrrolidone are disclosed as suitable monomers, there is no indication that they can be used in combination with unexpectedly good results.

U.S. Pat. No. 4,729,914 to Kliment et al. discloses a method of grafting hydrophilic polyvinylpyrrolidone coatings by applying to a substrate having active hydrogen sites a copolymer of vinylpyrrolidone containing free isocyanate groups capable of reacting with the substrate. Chemical bonds between the isocyanate and the active hydrogen sites prevent leaching of polyvinylpyrrolidone from the substrate during use. However, this method of grafting requires that the substrate contain active hydrogen sites on the surface.

As can be seen from the foregoing, the need exists for new and better methods for modifying the surface characteristics of polymeric substrates with n-vinyl pyrrolidone to provide the lubriciousness and hydrophilicity that renders such graft polymers useful in medical and other applications.

SUMMARY OF THE INVENTION

Improvements are provided in the process for producing a solution graft copolymer of an ethylenically unsaturated compound upon a substantially insoluble preformed solid or semi-solid polymeric substrate having hydroperoxide groups along the polymer chains thereof, in the presence of variable valence metal ions in a reduced state capable of oxidizing to suppress homopolymerization of the ethylenically unsaturated monomer in said solution, wherein one improvement comprises utilizing n-vinyl pyrrolidone as the ethylenically unsaturated monomer, selecting a substrate insoluble in n-vinyl pyrrolidone, carrying out the polymerization under alkaline conditions, and utilizing a combination of metal salts to provide the variable valence metal ion.

The other improvement comprises utilizing a "seeding" monomer to effectively externalize a hydrophilic graft copolymer under conditions where the natural association between the monomer and the substrate results in copolymer which is effectively internalized.

In the preferred embodiment n-vinyl pyrrolidone is surface-grafted upon an organosiloxane polymer substrate.

DETAILED DESCRIPTION OF THE PREFERRED EMBODIMENTS

Many of the above-described problems are overcome by the method of grafting n-vinyl pyrrolidone onto the surface of a organopolysiloxane polymeric substrate in alkaline solution disclosed herein. Thus, the present invention provides a method by which n-vinyl pyrrolidone, the hydrophilic polymer of which has established, documented favorable biocompatiblity, can be utilized as a surface coating on polymer substrates having sufficient strength and durability to be useful for the manufacture of medical devices. A polyvinyl pyrrolidone surface coating is highly desirable because it is free of the onus of being a neurotoxin in applications where this may be a perceived drawback, as is usually the case in medical applications.

The substrate to be treated by the process of this invention can be any solid or semi-solid synthetic or natural polymer containing aliphatic species, the surface of which polymer substrate, upon being subjected to high energy ionizing radiation or ozonization by methods known in the art, yields alkyl peroxides without being significantly degraded. Preformed polymer substrates in which n-vinyl pyrrolidone is insoluble, such as polyethylene, polypropylene, polymethylmethacrylate, polycarbonates, cured epoxy resins, cellulosics, unplasticized polyvinyl chloride formulations, polystyrene, natural fibers, glassy polymers, as well as various copolymers and terpolymers thereof, can be grafted with a coating of n-vinyl pyrrolidone without the use of a seeding comonomer. However, substantial surface grafts of n-vinyl pyrrolidone can only be achieved on preformed polymer substrates having some solubility in or in association with n-vinyl pyrrolidone, including polyurethanes, silicones, polyesters, polyamides, and isoprene rubbers, if a seeding comonomer is used, as is described hereinafter.

Solubility of polymer substrates into aqueous monomer solutions used for grafting as referred to herein means that significant amounts of monomer may associate within the substrate polymer matrix. In practice, swelling of the substrate results, but generally not complete dissolution. For example, many substrate polymers such as silicones are cross-linked and therefore are not completely soluble in nVP or other solvents.

Methods of ozonation are described in detail in U.S. Pat. Nos. 4,311,573 and 4,589,964 both entitled "Process for Graft Copolymerization of a Pre-formed Substrate," which are hereby incorporated in their entirety by reference. Preferably, however, the surface of the substrate is exposed to ozone in the presence of sufficient humidity and for a sufficient length of time to generate hydroperoxide moieties thereon. See DeAntonio, et al., "Free Radical Graft Polymerization onto Polymer Surfaces: 1. Method and Quantification of Active Peroxide Sites on Polyethylene," *ACS Polymer Preprints,* Vol. 31, No. 2, p. 448.

While the substrate may take the form of a sheet, film, fiber or powder, usually a shaped or substantially-finished article is treated to impart to it the desired surface characteristics of increased lubricity and hydrophilicity or to increase bondability and biocompatibility or to provide a chemical or physical means of immobilizing enzymes, other biomolecules, or chemical species thereon, for example iodine, in the case of polyvinyl pyrrolidone. Also, since the polyvinyl pyrrolidone surface graft absorbs water, any water soluble therapeutic agent, for example an antibiotic, can be associated therein.

Following irradiation or ozonization by known methods the surface of the substrate will have stable hydroperoxide moieties which can be used to initiate graft polymerization of vinyl monomers. However, homolytic cleavage of hydroperoxide to initiate polymerization results in the generation of free hydroxyl radicals that are known to initiate homopolymerization of the monomer unless an inhibitor is provided to suppress the homopolymerization.

To combat homopolymerization of the monomer in the polymerization solution, salts are used having variable valence metal ions in a reduced state that oxidize upon reaction with and reduction of the hydroperoxide moieties in a redox reaction, as is described in detail in the above described publications. In general, ferrous ion and other variable valence metal ions are effective for inhibiting homopolymerization in acidic solution. But in the present method, which requires an alkaline solution to avoid hydrolyzing n-vinyl pyrrolidone, the homopolymerization-inhibiting salts must be selected to have complete or limited solubility in alkaline conditions.

The polymerization solution is buffered to maintain it in the basic range, generally at a pH between about 8 and 10. Any buffer capable of maintaining the pH in the desired range can be used, but the preferred buffer is carbonate/bicarbonate, and the preferred concentration of buffer is between about 0.05 and 0.10M.

Other base-soluble salts having a variable valence metal ion in the reduced state capable of oxidizing in a redox reaction with hydroperoxide moieties can be used. However it has unexpectedly been found that a combination of salts having the same variable valence metal ion is usually required to accomplish the desired surface graft of n-vinyl pyrrolidone. The best results are achieved using a combination of ferrous ammonium sulfate (FAS), which by itself fails to inhibit homopolymerization in this system, and potassium ferrocyanide (PFC) which does inhibit homopolymerization but fails by itself to facilitate grafting of the monomer(s) to the substrate. It should particularly be noticed that in some cases the necessary amounts of these salts exceed the solubility limits for these salts in the aqueous reaction solution. Preferably the polymerization solution contains from about 0.15 to 0.25 weight percent of ferrous ammonium sulfate based upon the weight of the solution, and from about 0.01 to 1.0 weight percent of potassium ferrocyanide. Ferrous ammonium sulfate is almost completely insoluble in basic aqueous solution; however, it is believed that the combination of two salts of the same variable valence ion (i.e., ferrous salts) promotes dissolution of the ions through the common ion effect and aids in getting enough of the variable valence ion into solution to prevent homopolymerization, and to initiate grafting.

As will be appreciated by those skilled in the art, the proper concentration of the monomer in solution can be determined by empirical experimentation. Generally, however the concentration of n-vinyl pyrrolidone in the solution is in the range between about 10 and 40 weight percent, preferably between about 10 and 20 weight percent of the solution.

Surface grafting of any hydrophilic monomer upon any polymeric substrate for which the monomer is a solvent causes special problems demanding a specialized surface-grafting procedure. This is especially true when the hydrophilic monomer selected is nVP. Certain elastomeric polymers such as isoprene rubbers, silicones, polyurethanes, plasticized polyvinyl chlorides, polyesters, polyamides and their copolymers, terpolymers, etc. exhibit some affinity for the nVP. Consequently, nVP associates with the substrate before polymerization takes place and the resultant graft is effectively internalized. It has been discovered that this effect can be combatted by introducing into the solution as a "seeding" monomer a very small amount of a second ethylenically unsaturated monomer having a higher reactivity with the substrate than n-VP has, for example, acrylic monomers, such as acrylamide, acrylic acid, 2-hydroxyethyl methacrylate (HEMA), 1-acrylamido-2-methyl-1-propane sulfonic acid (AMPS), methacrylic acid, or sodium methacrylate. Surprisingly, the seeding of from about 0.02 to 0.08 weight percent, and preferably from about 0.02 to 0.04 weight percent of the second ethylenically unsaturated monomer in the polymerization solution results in a graft that is largely confined to the surface of the substrate.

Although the chemical mechanism involved forms no part of this invention and the claims are not intended to be limited in any way by the mechanism presented here, it is believed that the above-described problem with surface grafting of nVP serves as a model for other similarly paired polymer systems (i.e., those in which the surface monomer exhibits affinity for the polymer substrate) and can be attributed to several basic kinetic steps. First the activation energy barrier and configurational entropy considerations are higher by at least a magnitude of order for nVP than for acrylamide and other acrylic monomers. As a result the initiation step in the reaction between nVP and the hydroperoxide is slow. Using a more reactive seeding monomer lowers the energy barriers and speeds up propagation of the grafted polymeric chain.

The relative reactivity ratio of the acrylamide is also greater for acrylamide than for nVP. Due to its higher reactivity, acrylamide has a greater probability of reacting with the surface hydroperoxides first. Since the kinetics of this initiation are much faster than those for nVP, it is believed that the graft polymerization is initiated before the nVP associates within the substrate matrix to an appreciable extent, thus resulting in an externally grafted copolymer. The propagation rates for these systems can be several orders of magnitude greater than the initiation rates. Consequently, once the polymerization is initiated, polymer chains tend to form on the substrate surface, forming a hydrophilic barrier that also limits the nVP association with the substrate.

The instantaneous monomer concentrations and the relative reactivities determine the final composition of the copolymer. Therefore, if the polymer chain is initiated with a small amount of the more reactive seeding monomer, the growing polymer chain forms essentially from repeating units of nVP. For example, if the seeding monomer is acrylamide at a concentration of 2 volume percent, and the first unit in the growing polymer chain is an acrylamide unit, there is a probability of about 90 percent that the next repeat unit will be an nVP unit. But for any nVP unit, the probability rises to about 98 percent that the next unit added to the chain will be another nVP unit. Thus, it is believed that by including a low concentration of a more reactive seeding monomer in the polymerization solution, a polymer chain consisting of essentially nVP units can be produced that will have, for all practical purposes, the physical and chemical characteristics (i.e., the hydrophilicity) of a homopolymer of nVP.

In the polymerization procedure the multiple valence salt(s), the n-vinyl pyrrolidone, the "seeding" monomer (if required), and the buffer are dissolved in water in a temperature controlled, airtight chamber kept under a nitrogen purge to eliminate the presence of oxygen.

In a second chamber, the reaction chamber, the preformed substrate is subjected to ozonation, preferably by corona discharge in the presence of humidity, for a period of time to be selected by one skilled in the art to produce enough hydroperoxide sites on the surface of the substrate to result in the desired copolymer thickness and amount of surface-grafting. Then the reaction chamber is purged of oxygen by a stream of nitrogen, after which the solution from the first chamber is then transported into the reaction chamber. Preferably the nitrogen purge is bubbled through the solution in the reaction chamber to provide a means of agitating the polymerization solution and maintaining an oxygen-free environment. The temperature and timing of the polymerization bath are determined for the chosen substrate based upon the reactivity of the system and the desired level of grafting by known means from the copolymerization kinetics of the monomer(s) with the chosen substrate.

Once the polymerization reaction has proceeded for the specified length of time, the surface-grafted substrate is removed, washed, and purified and can optionally be submitted to further processing, if desired. To determine whether a satisfactory surface grafting of n-vinyl pyrrolidone has been formed, the surface of the substrate can be tested with water soluble dyes, such as methylene blue, congo red, basic fuchsin, or others, to visualize the graft layer using microscopic methods. Alternate methods can also be employed to see whether the surface exhibits the increased lubricity and hydrophilicity associated with surface grafting of the hydrophilic monomers. For instance the surface can be flooded with water and inspected visually to detect the formation of beads of water, or the contact angle can be analyzed to determine the degree of hydrophilicity.

The following examples and the other disclosure of this application are provided for illustrative purposes only, and are not intended to limit the scope of the invention, which is as described in the claims below.

EXAMPLE 1

A solution consisting of 10 weight percent n-vinyl pyrrolidone was prepared by adding freshly distilled n-vinyl pyrrolidone (Aldrich No. V-340-9) to a volume of 0.05 molar sodium carbonate/sodium bicarbonate buffer adjusted to a pH of 9.4. 0.02 weight percent of sodium methacrylate (SMA) was added as the "seed" monomer. The solution was deoxygenated with a nitrogen purge followed by addition of 0.20 weight percent of ferrous ammonium sulfate (FAS) and 0.05 weight percent of potassium ferrocyanide (PFC). The solution was placed into a reservoir chamber where it was maintained under nitrogen purge and heated to 50 degrees Celsius.

Silicone substrate samples were cleaned by ultrasonication in 50/50 isopropanol and deionized water for 15 minutes, thoroughly rinsed in deionized water for 15 minutes, and dried. Clean, dry silicone rubber samples were loaded into the adjacent reactor chamber in such a manner as to allow full access of gas and liquids to all surfaces to be grafted. Ozone, generated by passage of dry grade oxygen through an ozone generator (corona discharge type OREC model #03V10-0) and then through a gas washing bottle containing water, was passed into a reaction chamber where it contacted the samples of substrate for a period of two hours. The ozone concentration was 4 percent by volume, the flow rate of ozonated air was 2.0 liters per minute, and the current flow to the ozone generator was adjusted to 1.75 amps. Gas pressure within the corona discharge of the ozone generator into the reaction chamber was maintained at 5.0 psi, and temperature in the reaction chamber was maintained at 50 degrees Celsius.

After two hours the ozone generator was turned off and the reaction chamber was purged with 2 to 5 liters per minute of nitrogen flow for 30 minutes to provide an oxygen free environment for the surface grafting step.

The monomer solution was transferred into the oxygen free reactor chamber from the reservoir chamber. The ozonated silicone samples were covered with the solution for eight hours while temperature and nitrogen purge were maintained at constant values.

After grafting was completed the unused solution was transferred back to the reservoir chamber to be stored for the next grafting cycle. The samples were then rinsed with water until no unreacted n-VP remained in the rinse water as determined by analysis with an ultraviolet-visible light spectrophotometer at a wavelength of 240 nm. Cross-sectional microscopic analysis revealed the presence of a surface graft 1–2 micrometers in thickness of polyvinyl pyrrolidone bound to the surfaces of the substrate silicone. The surfaces exhibited qualities of hydrophilicity and lubriciousness.

EXAMPLE 2

Using the method described in Example 1, a series of experiments were conducted to form surface grafts of n-VP on silicone substrates. Four initiators were tried using four different polar solvents in 40 weight percent solution of n-vinyl-2-pyrrolidone, as shown below in Table 1. All the samples of silicone substrate were ozonated for one hour at an ozone concentration of approximately three percent by gas volume.

TABLE 1

| Wt. % Initiator | Wt. % n-VP | Solvent | Result |
| --- | --- | --- | --- |
| DABCO 0.25% | 40 | $CH_3CN$ | No surface graft |
| DHEPT 0.25% | 40 | $CH_3CN$ | No surface graft |
| DHEPT 0.25% | 40 | Ethanol | No surface graft |
| DHEPT 0.25% | 40 | Buffer/Ethanol | No surface graft |
| DHEPT 0.25% | 40 | Buffer/$H_2O$* | No surface graft |
| DHEPT 0.10% | 40 | Buffer/$H_2O$* | No surface graft |
| DHEPT 0.50% | 40 | Buffer/$H_2O$* | No surface graft |
| BSA 0.25% | 40 | $CH_3CN$ | No surface graft |
| Ferrocene 9.25% | 40 | Buffer/$H_2O$* | No surface graft |
| FDCA 0.25% | 40 | Buffer/$H_2O$* | No surface graft |

DHEPT = dihydroxyethylparatoluidine (Eastman)
DABCO = triethylene diamine, (Air Products)
BSA = benzene sulfonic acid, (Aldrich)
FDCA = dihydroxyethylparatoluidine (Eastman)
*pH 9.4 Sodium Carbonate/bicarbonate buffer, 0.05M Solutions containing DHEPT homopolymerized, becoming very viscous, based upon tactile evaluation, and gave the silicone a lubricious surface based upon tactile evaluation; however, the lubricity eroded upon mechanical abrasion or soaking of the sample in water.

EXAMPLE 3

Using the method of Example 1, various initiators were used in combination with various solvents at 40, 60 or 100 weight percent concentrations of n-VP, as shown below in Table 2. To test for occurrence of surface grafting, all the samples of silicone substrate were weighed before and after the grafting to determine if a weight increase occurred.

TABLE 2

| Wt. % Initiator | Wt. % n-VP | Solvent | Results |
| --- | --- | --- | --- |
| DHEPT 0.1% | 40 | Buffer/$H_2O$* | No surface graft |
| DHEPT 0.1% | 100 | — | No surface graft |
| $NH_4OH$ 0.25% | 40 | Buffer/$H_2O$* | No surface graft |
| DHEPT 0.5% | 60 | Buffer/$H_2O$* | No surface graft |
| BSA 0.1% | 40 | Buffer/$H_2O$* | No surface graft |
| BSA 0.1% | 100 | — | No surface graft |
| $NH_4OH$ 0.25% | 100 | — | No surface graft |
| $NH_4OH$ 0.25% | 40 | $CH_3CN$ | No surface graft |
| DHEPT 0.025% | 40 | Buffer/$H_2O$* | No surface graft |
| BSA 0.1% | 40 | $CH_3CN$ | No surface graft |

In the samples utilizing DHEPT as initiator, homopolymerization occurred and substrate weight gains of from 1 to 2 percent were evident, but lubricity was unstable as in Example 2. The other initiators caused no weight gain of the sample, but the solution remained very fluid.

EXAMPLE 4

Further experiments were conducted according to the method of Example 1 with an aqueous solution of n-VP at 40 weight percent and a silicone substrate, but using Sorenson's phosphate buffer, in order to explore a lower pH range than is possible with the carbonate buffer used in the above examples. Samples having three concentrations of DHEPT were used: 0.10, 0.25 and 0.50 weight percent, each at pH values of 7.0, 7.5 and 8.0. BSA was also tested at a concentration of 0.25% weight percent and pH of 7.5. All solutions homopolymerized and exhibited substrate weight gains, yet the lubricity apparent on the silicone readily wore off, as described before.

EXAMPLE 5

To observe the effects of varying the concentration of the n-VP monomer in aqueous solution buffered with carbonate/bicarbonate buffer, two series of experiments were conducted using the method of Example 1. In the first series, the weight percent of n-VP was 5, 10, 25, or 50% and the concentration of DHEPT as initiator was 0.25 weight percent. In the second series, the weight percent of n-VP was again 5, 20, 35 or 50% but the concentration of DHEPT was 0.1 weight percent. Although viscosity increased with increasing concentrations of monomer, as tested visually or by a Brookfield viscometer, the concentration of DHEPT had little or no correlation with the viscosity and lubricity. The solutions having the greatest viscosity gave a lubricious feel to the silicone, yet wore off upon handling or extended soaking in water.

EXAMPLE 6

To determine whether water was involved in a radical transfer reaction (a reaction that would explain the observation of homopolymerization in the absence of surface grafting), a series of experiments were conducted using the method of Example 1 with a n-VP concentration of 40 weight percent, a silicone substrate, and a DHEPT concentration of 0.10 weight percent, but using one of the following aprotic solvents: tetrahydrofuran, n-methylmorpholine, 1,4-dioxane, acetone, methylpyrrolidone, dimethylacetamide, dimethylsulfoxide, toluene and dimethylfuran. None of the silicone substrates displayed any weight gain indicating grafting, and no homopolymerization occurred in any of the solutions.

EXAMPLE 7

In this experiment, ferrous ammonium sulfate (FAS) and ferrous oxalate (FO) were tested for possible initiation of surface grafting in various solvents, at various pH values and using various concentrations of n-VP as monomer, as shown below in Table 3.

TABLE 3

| Wt. % Initiator | Wt. % n-VP | Wt. % Solvent or Buffer | Results |
| --- | --- | --- | --- |
|  | 40 | 60 n-methylmorpholine | No surface graft |
| 0.10% DHEPT | 40 | 60 H$_2$O/pH 9.4 carbonate | No surface graft |
| 0.25% FAS | 100 | — | No surface graft |
| 0.25% FAS | 40 | 60 H$_2$O/pH 7.0 phosphate | No surface graft |
| 0.25% FAS | 40 | 60 H$_2$O/pH 9.4 carbonate | No surface graft |
| 0.25% FO | 40 | 60 H$_2$O/pH 7.0 phosphate | No surface graft |
| 0.25% FO | 100 | — | No surface graft |

All samples showed homopolymerization except for the one using n-methylmorpholine as solvent. However, none of the solutions gave a lubricious or hydrophilic graft.

EXAMPLE 8

A series of experiments were conducted to determine whether the presence of 0.05 weight percent of acrylamide in a 40 weight percent solution of n-VP would facilitate surface grafting of the n-VP. Various combinations of initiator and buffer in aqueous solution were utilized. The results are summarized in Table 4 below.

TABLE 4

| Wt. % Initiator | Wt. % n-VP | Wt. % Acrylamide | Buffer | Result |
| --- | --- | --- | --- | --- |
| 0.10 DHEPT | 40 | 0.05 | pH 9.4 carbonate | No surface graft |
| 0.25 FAS | 40 | 0.05 | pH 9.4 carbonate | Heavy surface graft |
| — | 40 | 0.05 | pH 7.0 phosphate | No surface graft |
| 0.25 FAS | 40 | 0.05 | pH 7.0 phosphate | Surface graft |
| 0.25 FAS & 0.10 DHEPT | 40 | 0.05 | pH 7.0 phosphate | Surface graft |

The substrate of the experiment containing acrylamide and FAS at pH 9.4 swelled, exhibited a weight gain of 33.8 percent, and had a lubricious, but grainy surface. Samples 4 and 5, also utilizing FAS as initiator, displayed a grainy textured graft and were semi-lubricious. The small amount of acrylamide, the seed monomer, in the solution was not enough to account for the amount of weight increase, proving that acrylamide was not the sole monomer responsible for the graft. Fourier Transform Infra Red analysis detected the presence of PVP only in the graft layer.

EXAMPLE 9

A series of experiments were conducted according to the method of Example 1 wherein the aqueous solution contained 40 weight percent n-VP, 0.25 weight percent FAS, and a pH 9.4 carbonate buffer. Also added to the solution were various additional monomers as shown in Table 5 below.

TABLE 5

| Sample No. | Wt. % of seed monomer | Result |
| --- | --- | --- |
| 1 | 0.05 acrylamide | Surface graft |
| 2 | 0.01 acrylamide | Surface graft |
| 3 | 0.10 acrylamide | Surface graft |
| 4 | 0.05 acrylic acid | Surface graft |
| 5 | 0.05 AMPS | Surface graft |
| 6 | 0.05 HEMA | Surface graft |
| 7 | 0.005 acrylamide | Surface graft |
| 8 | 0.50 acrylamide | Surface graft |

Weight increases of approximately 1.0% as well as increased lubricity and hydrophilicity were found for all samples. These results were desirable but homopolymerization of the solution was prevalent and thus the solution could not be reused as would be necessary if the process were scaled up to production levels.

EXAMPLE 10

A series of tests were conducted according to the method of Example 1 using sodium methacrylate (SMA) as the seed monomer. Selecting a seed monomer having a reactivity ratio with n-VP slightly higher than that of acrylamide assured that the seed monomer would not be prematurely consumed. Potassium ferrocyanide (PFC) was used as the initiator. The amounts of the seed monomer and of the initiator were varied as shown in Table 6 below. In all tests the substrate was silicone, and the aqueous solution was buffered to pH 9.4 with carbonate/bicarbonate buffer and contained 40 weight percent of n-VP.

TABLE 6

| Sample No. | Wt. % PFC | Wt. % SMA | Result |
| --- | --- | --- | --- |
| 1 | 0.001 | 0.04 | No surface graft |
| 2 | 0.001 | 0.12 | No surface graft |
| 3 | 0.001 | 0.40 | No surface graft |
| 4 | 0.005 | 0.04 | No surface graft |
| 5 | 0.005 | 0.12 | No surface graft |
| 6 | 0.005 | 0.40 | No surface graft |

Solubility of the PFC was good and homopolymerization of the solutions was greatly reduced by using potassium ferrocyanide, but no graft was evident. The samples were not lubricious or hydrophilic and exhibited small weight gains.

EXAMPLE 11

In this experiment conducted according to the method of Example 1, various amounts of acrylamide (AAm), acrylic acid (AA), sodium acrylate (SA), hydroxyethylmethacrylate (HEMA), 2-acrylamido-2-methylpropanesulfonic acid (AMPS), and sodium methacrylate (SMA) as seed monomer are combined with FAS or PFC as iron salt initiator, as shown in Table 7 below. All substrates were silicone, and aqueous solutions containing 40 weight percent of n-VP were buffered to pH 9.4 with carbonate/bicarbonate buffer.

TABLE 7

| Sample No. | Wt. % Seed monomer | Wt. % Initiator | Result |
|---|---|---|---|
| 1 | AAm 0.08 | FAS 0.25 | Surface graft |
| 2 | SA 0.08 | FAS 0.25 | Surface graft |
| 3 | AMPS 0.08 | FAS 0.25 | Surface graft |
| 4 | HEMA 0.08 | FAS 0.25 | Surface graft |
| 5 | SMA 0.08 | FAS 0.25 | Surface graft |
| 6 | SMA 0.08 | PFC 0.01 | No surface graft |
| 7 | SMA 0.08 | PFC 0.05 | No surface graft |
| 8 | SA 0.08 | PFC 0.001 | No surface graft |
| 9 | SA 0.08 | PFC 0.01 | No surface graft |
| 10 | SA 0.08 | PFC 0.10 | No surface graft |

Samples 1-5 containing FAS gave lubricious surfaces with significant weight gains, yet the solutions also became viscous and discolored. In samples 5-10, on the other hand, the substrates showed no weight gain indicating that use of PFC prevented grafting of the n-VP. However, the solutions did not homopolymerize.

EXAMPLE 12

In this experiment ferrous ammonium sulfate and potassium ferrocyanide were used in combination at various concentration ratios, as shown in Table 8, while all of the solutions were aqueous and contained 0.08 weight percent of sodium methacrylate as seed monomer, 40 weight percent n-VP, and sufficient sodium carbonate/bicarbonate buffer to maintain a pH of 9.4.

TABLE 8

| Sample No. | Wt. % Initiator | Results |
|---|---|---|
| 1 | FAS 0.245, PFC 0.005 | Surface graft |
| 2 | FAS 0.240, PFC 0.010 | Surface graft |
| 3 | FAS 0.200, PFC 0.050 | Surface graft |
| 4 | FAS 0.150, PFC 0.100 | Surface graft |
| 5 | FAS 0.250, no PFC | Surface graft |
| 6 | FAS 0.250, PFC 0.005 | Surface graft |
| 7 | FAS 0.250, PFC 0.010 | Surface graft |
| 8 | FAS 0.250, PFC 0.050 | Surface graft |
| 9 | FAS 0.250, PFC 0.100 | Surface graft |

The combination of FAS and PFC yields desirable results. Weight gains in the 1.0% to 1.5% range were consistent, the lubricity and hydrophilicity were good, and the solutions remained fluid, showing little or no signs of homopolymerization. Sample 5 exhibited homopolymerization when PFC was not used.

EXAMPLE 13

To determine the optimal concentration of seed monomer a series of tests were conducted using the method of Example 1 in which the aqueous solution contained 0.05 weight percent PFC, 0.20 weight percent FAS, 10 weight percent n-VP, and 0.05M carbonate/bicarbonate buffer to maintain a pH of 9.4. The weight percent concentration of sodium methacrylate was varied, as shown in Table 9 below.

TABLE 9

| Sample No. | Wt. % SMA | Results |
|---|---|---|
| 1 | 0.02 | Surface graft |
| 2 | 0.065 | Surface graft |
| 3 | 0.21 | Surface graft |
| 4 | 0.75 | No surface graft |

The concentration of seed monomer having the highest weight gain was 0.02 weight percent. As the concentration of SMA increased, the amount of graft decreased until the silicone substrates exposed to a solution containing 0.75 weight percent of SMA exhibited no surface graft of PVP.

EXAMPLE 14

In this experiment, using the method of Example 1, the concentrations of the n-VP and of the seed monomer were varied as shown in Table 10 below. The purpose of the experiment was to observe the effect of varied combinations of monomer and seed monomer upon surface grafting onto silicone substrates. The concentrations of activators in the aqueous solution (buffered with carbonate/bicarbonate buffer to a pH of 9.4) remained constant at 0.20 weight percent FAS and 0.05 weight percent PFC.

TABLE 10

| Sample No. | Wt. % n-VP | Wt. % SMA | Results |
|---|---|---|---|
| 1 | 40 | 0.08 | Surface graft |
| 2 | 30 | 0.06 | Surface graft |
| 3 | 20 | 0.04 | Surface graft |
| 4 | 10 | 0.02 | Surface graft |
| 5 | 10 | 0.08 | Surface graft |

All combinations of primary and seed monomer yielded good lubricity and hydrophilicity, but the highest weight gains were recorded for samples 3 and 4. For commercial applications, it was determined that the concentrations of Example 4 would be favored to reduce the cost of materials.

EXAMPLE 15

The purpose of this experiment was to ascertain the optimum concentration of PFC, so the test of sample 4 in example 14 above was repeated except that the concentration of PFC was varied from 0.005 to 0.10 weight percent. All of the samples exhibited weight gains of about 0.7 weight percent. The highest gains were recorded for the samples having PFC concentrations of 0.08, 0.05 and 0.03 weight percent.

Although an exemplary embodiment of the invention has been shown and described, many changes, modifications, and substitutions may be made by one having ordinary skill in the art without necessarily departing from the spirit and scope of the invention.

What is claimed is:

1. A process for producing a graft copolymer which comprises the graft polymerization of ethylenically unsaturated compounds, in solution, with a substantially insoluble preformed solid or semi-solid polymeric substrate having hydroperoxide groups along the polymer chains thereof, in the presence of a variable valence metal ion in a reduced state capable of oxidizing to suppress homopolymerization of the ethylenically unsaturated monomer in said solution, wherein the improvement comprises:

utilizing n-vinyl pyrrolidone as the ethylenically unsaturated monomer, selected a substrate insoluble in n-vinyl pyrrolidone, carrying out the polymerization under aqueous alkaline conditions, and utilizing a combination of at least two metal salts to provide the variable valence metal ions, said at least two metal salts being sufficiently soluble under alkaline conditions in aqueous solution to inhibit homopolymerization of the ethylenically unsaturated monomer.

2. The process of claim 1 wherein the same variable valence ion is provided by at least two salts in the combination.

3. The process of claim 1 wherein the combination of metal salts comprises ferrous ammonium sulfate and potassium ferrocyanide.

4. The process of claim 3 wherein the ferrous ammonium sulfate is from about 0.15 to 0.25 weight percent and the potassium ferrocyanide is from about 0.01 to 1.0 weight percent of the polymerization solution.

5. The process of claim 1 wherein the pH of the polymerization solution is in the range from about 8 to 10.

6. The process of claim 5 wherein the solution contains a buffer.

7. The process of claim 6 wherein the buffer comprises sodium carbonate and bicarbonate.

8. The process of claim 1 wherein the n-vinyl pyrrolidone comprises from about 10 to 40 weight percent of the solution.

9. The process of claim 8 wherein the n-vinyl pyrrolidone comprises from about 10 to 20 weight percent of the solution.

10. A process for producing a graft copolymer which comprises the graft polymerization of ethylenically unsaturated compounds, in aqueous solution, with a preformed solid or semi-solid polymeric substrate having hydroperoxide groups along the polymer chains thereof, in the presence of a variable valence metal ion in a reduced state capable of oxidizing to suppress homopolymerization of the ethylenically unsaturated monomer in said solution, wherein the improvement comprises:
utilizing n-vinyl pyrrolidone as the ethylenically unsaturated monomer;
carrying out the polymerization under alkaline conditions in aqueous solution in the presence of a seed ethylenically unsaturated monomer having a higher reactivity with the substrate than n-vinyl pyrrolidone the monomer being present in an amount sufficient to effect surface grafting of N-vinyl pyrrolidone and prohibit graft internal reaction; and
utilizing a combination of at least two metal salts to provide the variable valence metal ion, the metal salts being sufficiently soluble under alkaline conditions in aqueous solution to inhibit homopolymerization of the ethylenically unsaturated monomer.

11. The process of claim 10 wherein the substrate is selected from the group consisting of polymers that are soluble in n-vinyl pyrrolidone.

12. The process of claim 11 wherein the substrate is selected from the group consisting of polymethylmethacrylate, polycarbonates, cured epoxy resins, cellulosics, polyvinyl chloride formulations, polystyrene, elastomeric materials selected from the group consisting of polyurethanes, polyorganosiloxanes, polyesters, polyamides, isoprene rubbers, and various copolymers and terpolymers thereof.

13. The process of claim 10 wherein the substrate is an elastomeric polymer.

14. The process of claim 13 wherein the substrate is an elastomeric polymer selected from the group consisting of polyorganosiloxanes, isoprene rubbers, polyurethanes, plasticized polyvinyl chlorides, polyesters, and polyamides.

15. The process of claim 10 wherein the seed monomer is present in amounts sufficient to effect substantially surface grafting of the n-vinyl pyrrolidone.

16. The process of claim 14 wherein the seed monomer is selected from the group of acrylic monomers.

17. The process of claim 14 wherein the seed monomer is selected from the group of acrylic monomers consisting of acrylamide, acrylic acid, 2-hydroxyethyl methacrylate, 1-acrylamido-2-methyl-1-propane sulfonic acid, methacrylic acid, and sodium methacrylate.

18. The process of claim 14 wherein the amount of seed monomer in the solution comprises from about 0.02 to 0.08 weight percent thereof.

19. The process of claim 16 wherein the amount of seed monomer in the solution comprises from about 0.02 to 0.04 weight percent thereof.

20. The process of claim 10 wherein the same variable valence ion is provided by at least two salts in the combination.

21. The process of claim 10 wherein the combination of metal salts comprises ferrous ammonium sulfate and potassium ferrocyanide.

22. The process of claim 21 wherein the ferrous ammonium sulfate is from about 0.15 to 0.25 weight percent and the potassium ferrocyanide is from about 0.01 to 1.0 weight percent of the polymerization solution.

23. The process of claim 10 wherein the pH of the polymerization solution is in the range from about 8 to 10.

24. The process of claim 21 wherein the solution contains a buffer.

25. The process of claim 24 wherein the buffer comprises sodium carbonate and bicarbonate.

26. The process of claim 10 wherein the n-vinyl pyrrolidone comprises from about 10 to 40 weight percent of the solution.

27. The process of claim 26 wherein the n-vinyl pyrrolidone comprises from about 10 to 20 weight percent of the solution.

* * * * *